(12) United States Patent
Chae (10) Patent No.: US 9,835,231 B2
(45) Date of Patent: Dec. 5, 2017

(54) TRANSMISSION APPARATUS OF HYBRID VEHICLE

(71) Applicant: Hyundai Motor Company, Seoul (KR)

(72) Inventor: Geum Muk Chae, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 193 days.

(21) Appl. No.: 14/846,784

(22) Filed: Sep. 6, 2015

(65) Prior Publication Data
US 2016/0369873 A1 Dec. 22, 2016

(30) Foreign Application Priority Data
Jun. 19, 2015 (KR) .......................... 10-2015-0087552

(51) Int. Cl.
| | |
|---|---|
| *F16H 3/72* | (2006.01) |
| *F16H 61/18* | (2006.01) |
| *B60K 6/00* | (2006.01) |
| *B60K 17/02* | (2006.01) |
| *B60K 17/04* | (2006.01) |
| *B60K 17/26* | (2006.01) |
| *B60K 23/06* | (2006.01) |

(52) U.S. Cl.
CPC ............... *F16H 3/728* (2013.01); *B60K 6/00* (2013.01); *B60K 17/02* (2013.01); *B60K 17/04* (2013.01); *B60K 17/26* (2013.01); *B60K 23/06* (2013.01); *F16H 61/18* (2013.01); *B60Y 2300/424* (2013.01); *B60Y 2400/73* (2013.01); *F16H 2061/185* (2013.01)

(58) Field of Classification Search
None
See application file for complete search history.

(56) References Cited

U.S. PATENT DOCUMENTS

| | | | |
|---|---|---|---|
| 6,244,965 B1* | 6/2001 | Klecker | F16D 41/12 192/43.1 |
| 7,992,695 B2* | 8/2011 | Wittkopp | F16D 25/00 192/41 R |
| 2005/0070397 A1* | 3/2005 | Takasu | B60K 6/365 475/254 |

(Continued)

FOREIGN PATENT DOCUMENTS

| | | |
|---|---|---|
| JP | 3456831 B2 | 10/2003 |
| JP | 2011-011579 A | 1/2011 |

(Continued)

*Primary Examiner* — Justin Holmes
(74) *Attorney, Agent, or Firm* — Mintz Levin Cohn Ferris Glovsky and Popeo, P.C.; Peter F. Corless (57) ABSTRACT

A transmission apparatus of a hybrid vehicle is provided. The apparatus includes a planetary gear set including a first rotation element connected to an engine, a second rotation element connected to a first motor/generator, and a third rotation element connected to a second motor/generator. An output gear is connected to any one of the second and third rotation elements and a two-way clutch is mounted at the first rotation element. The clutch limits D stage rotation in a first side direction or limits R stage rotation in a second side direction selectively based on a position of a lever. Accordingly, the clutch performs a failsafe function by preventing a shifting stage from being applied to the R stage when the engine is driven.

17 Claims, 7 Drawing Sheets

(56) References Cited

U.S. PATENT DOCUMENTS

| | | | | |
|---|---|---|---|---|
| 2011/0086737 A1* | 4/2011 | Phillips | ............... | B60K 6/365 |
| | | | | 475/5 |
| 2011/0177900 A1* | 7/2011 | Simon | ............... | B60K 6/445 |
| | | | | 475/5 |
| 2012/0203403 A1* | 8/2012 | Lee | ............... | B60K 6/383 |
| | | | | 701/22 |
| 2014/0100071 A1* | 4/2014 | Kimes | ............... | B60K 1/02 |
| | | | | 475/5 |

FOREIGN PATENT DOCUMENTS

| | | | |
|---|---|---|---|
| KR | 10-2012-0069281 | A | 6/2012 |
| KR | 10-2013-0013283 | A | 2/2013 |
| KR | 10-2013-0136779 | A | 12/2013 |
| KR | 10-2014-0048571 | A | 4/2014 |
| KR | 10-1518947 | B1 | 5/2015 |
| KR | 10-1518949 | B1 | 5/2015 |

* cited by examiner

TRANSMISSION APPARATUS OF HYBRID VEHICLE

CROSS-REFERENCE TO RELATED APPLICATION

This application claims priority to and the benefit of Korean Patent Application No. 10-2015-0087552 filed in the Korean Intellectual Property Office on Jun. 19, 2015, the entire contents of which are incorporated herein by reference.

BACKGROUND (a) Field of the Invention

The present invention relates to a transmission apparatus of a hybrid vehicle and more particularly, the present invention relates to a transmission apparatus of a hybrid vehicle that includes a safety unit to prevent rotation of a two-way clutch in a particular direction when an engine of the hybrid vehicle is driven.

(b) Description of the Related Art

Generally, a hybrid vehicle is a vehicle that is driven by efficiently combining two or more different types of power sources. The hybrid vehicle generally uses an engine and a motor/generator as power sources. The hybrid vehicle uses the motor/generator having relatively excellent low speed torque characteristics as a main power source at a low speed and uses the engine having relatively excellent high speed torque characteristics as a main power source at a high speed. Therefore, since the hybrid vehicle terminates an operation of the engine using fossil fuel and uses the motor/generator in a low speed section, fuel efficiency is improved and exhaust gas is reduced.

The hybrid vehicle as described above includes a first motor/generator, a second motor/generator, and a clutch. The first motor/generator is configured to perform a starting or power-generating function of the engine, and the second motor/generator is configured to drive or brake the hybrid vehicle. In addition, the clutch may be configured in a one-way clutch type to selectively connect or disconnect driving elements of the motor and driven elements of vehicle wheels to or from each other. For example, the clutch and the engine are disconnected in an electronic vehicle (EV) mode in which the hybrid vehicle is driven by a driving torque of the motor, and are connected in a hybrid electronic vehicle (HEV) mode in which the hybrid vehicle is driven by driving torques of the motor and the engine.

In the one-way clutch type, there is a limitation that the second motor/generator is operated only in the state in which it rotates in a forward direction, that is, when the vehicle moves forward. Therefore, research into a two-way clutch type in which the second motor/generator may rotate in a reverse direction even when the vehicle moves rearward has been conducted. However, when applying the two-way clutch to the hybrid vehicle and a lever of the two-way clutch moves to a specific direction (e.g., a reverse (R) stage) during a period in which the engine is driven due to an error in a control or an inexperienced manipulation, a torque of the engine may be applied in a direction in which a carrier is locked. Therefore, the two-way clutch may be damaged or the engine may be stopped.

The above information disclosed in this section is merely for enhancement of understanding of the background of the invention and therefore it may contain information that does not form the prior art that is already known in this country to a person of ordinary skill in the art.

SUMMARY

The present invention provides a transmission apparatus of a hybrid vehicle having advantages of preventing a lever of a two-way clutch from being positioned at an R stage during a period in which an engine of the hybrid vehicle is driven.

An exemplary embodiment of the present invention provides a transmission apparatus of a hybrid vehicle that may include: a planetary gear set including a first rotation element connected to an engine, a second rotation element connected to a first motor/generator, and a third rotation element connected to a second motor/generator; an output gear connected to any one of the second and third rotation elements; a two-way clutch mounted at the first rotation element and limiting (e.g., drive (D) stage) rotation in one side direction (e.g., a first side direction) or limiting (R stage) rotation in the other side direction (e.g., a second side direction) selectively based on a position of a lever; and a safety unit configured to prevent the two-way clutch from being positioned at the R stage when the engine is driven.

A plurality of teeth that protrude radially based on an input shaft may be formed at the first rotation element, a coupling may be formed at the safety unit to be caught between the plurality of teeth, and when the two-way clutch is positioned at the R stage when the engine is driven, the coupling may be caught between the plurality of teeth. The plurality of teeth may be formed in a trapezoidal shape.

The two-way clutch may further include: a controller configured to apply an input signal of the D stage or the R stage based on a state of the vehicle; a gear part configured to rotate based on the input signal received from the controller; a connector connected to the gear part and configured to move to one side or the other side; an actuating lever coupled to the connector and configured to rotate in one side direction or the other side direction to position the two-way clutch at the D stage when the connector moves to one side and at the R stage when the connector moves to the other side; and a lever hinge provided to hinge-couple the connector to the actuating lever.

The gear part may include an input gear configured to perform pendular movement based on the input signal of the controller; and a connection gear engaged with the input gear. The connection gear may include a connection protrusion that protrudes forward or rearward, the connector may include an insertion aperture, and the connection protrusion may be inserted into and connected to the insertion aperture. The safety unit may have one side (e.g., a first side) coupled to a fixed hinge and may have a slot formed therein and opened in a length direction thereof. The lever hinge may linearly reciprocate to one side or the other side within the slot.

When the two-way clutch is applied to the D stage, the lever hinge may move to one side, to cause the safety unit to rotate in one side direction to become distant from the first rotation element, and when the two-way clutch is applied to the R stage, the lever hinge may move to the other side, to cause the safety unit to rotate in the other side direction to be caught between the plurality of teeth of the first rotation element. The two-way clutch may further include a motor provided to receive the input signal from the controller to rotate the gear part by a predetermined angle.

Another exemplary embodiment of the present invention provides a transmission apparatus of a hybrid vehicle using an engine and first and second motor/generators as power sources, that may include: a planetary gear set including a planetary carrier connected to the engine, a sun gear connected to the second motor/generator, and a ring gear operated as an output element; an output gear connected to the first motor/generator and engaged with the ring gear; a two-way clutch configured to limit (D stage) rotation in one side direction or limit (R stage) rotation in the other side direction selectively based on a position of a lever and mounted at the planetary carrier; and a safety unit configured to prevent the two-way clutch from being positioned at the R stage when the engine is driven.

A plurality of teeth that protrude radially based on an input shaft may be formed at the planetary carrier, a coupling may be formed at the safety unit to be caught between the plurality of teeth, and when the two-way clutch is positioned at the R stage when the engine is driven, the coupling may be caught between the plurality of teeth. The plurality of teeth may be formed in a trapezoidal shape.

The two-way clutch may further include: a gear part configured to rotate in one side direction or the other side direction along the D stage or the R stage; a connector connected to the gear part and configured to move to one side or the other side; an actuating lever coupled to the connector and configured to rotate in one side direction or the other side direction to position the two-way clutch at the D stage when the connector moves to one side and at the R stage when the connector moves to the other side; and a lever hinge provided to hinge-couple the connector to the actuating lever.

The gear part may include a connection protrusion that protrudes forward or rearward, the connector may include an insertion aperture, and the connection protrusion may be inserted into and connected to the insertion aperture. The safety unit may have one side coupled to a fixed hinge and may have a slot formed therein and opened in a length direction thereof, and the lever hinge may linearly reciprocate to one side or the other side within the slot.

When the two-way clutch is applied to the D stage, the lever hinge may move to one side, to cause the safety unit to rotate in one side direction to become distant from the planetary carrier, and when the two-way clutch is applied to the R stage, the lever hinge may move to the other side, to rotate the safety unit in the other side direction to be caught between the plurality of teeth of the planetary carrier.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings. For convenience of explanation, the left of the drawing will be called 'one side', "a first side', 'one end', 'one end portion', and names similar to them, and the right of the drawing will be called 'the other side', 'a second side', 'the other end', 'the other end portion', and names similar to them. Throughout the present specification, portions denoted by the same reference numerals mean the same or similar components.

Figure 1:
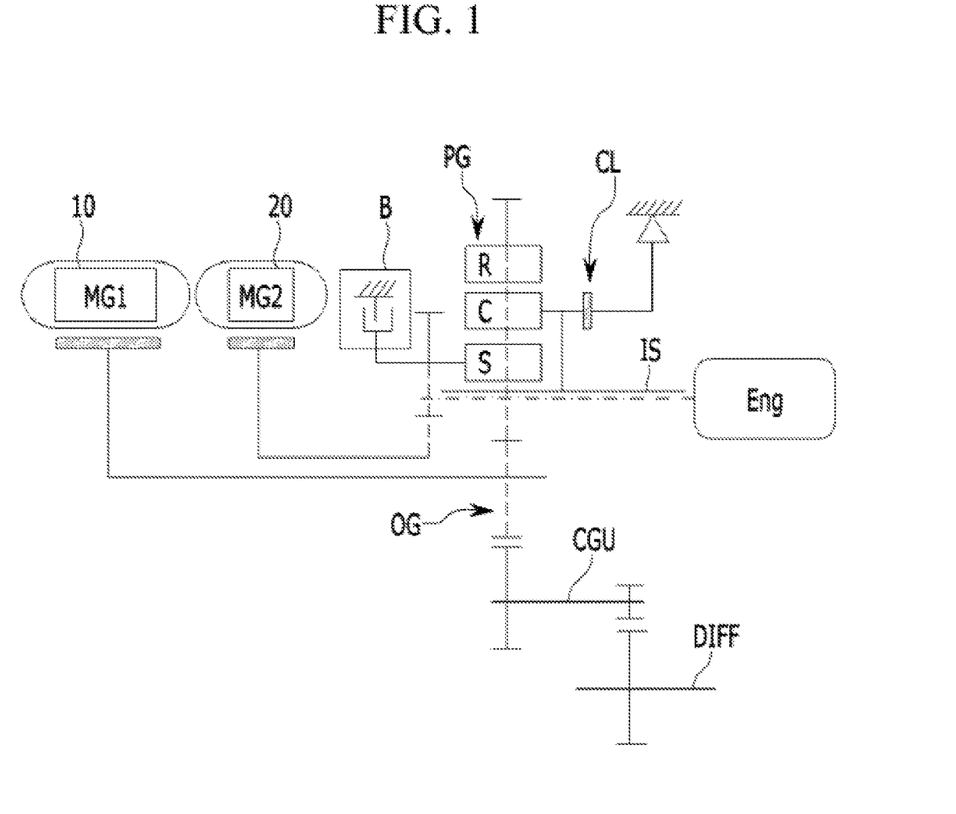
FIG. 1 is a view of a transmission apparatus of a hybrid vehicle according to an exemplary embodiment of the present invention in which a two-way clutch is used.

FIG. 1 is a view of a transmission apparatus of a hybrid vehicle according to an exemplary embodiment of the present invention in which a two-way clutch is used. Referring to FIG. 1, the transmission apparatus of a hybrid vehicle according to an exemplary embodiment of the present invention may be configured to shift power of an engine Eng and first and second motor/generators MG1 and MG2, which are power sources, based on a driving state of the vehicle and output the shifted power through an output gear OG.

The transmission apparatus may include the first and second motor/generators MG1 and MG2, a planetary gear set PG, the output gear OG, a clutch CL, and a reduction gear unit CGU. The first motor/generator MG1 and the second motor/generator MG2, which are independent power sources, may simultaneously function as a motor and a generator. The first motor/generator MG1 may be directly connected to a ring gear R of the planetary gear set PG to serve as a start motor configured to drive the engine or receive rotation power of the engine through the ring gear R to serve as a generator configured to generate electricity while being rotated. The second motor/generator MG2 may be directly connected to the first output gear OG to serve as a motor configured to supply rotation power. The first and second motor/generators MG1 and MG2 and the planetary gear set configured as described above may be disposed on an input shaft IS.

The planetary gear set PG, which may be a single pinion planetary gear set, may include a sun gear S, a carrier C configured to rotate and support a pinion externally engaged with the sun gear S, and a ring gear R internally engaged with the pinion, as rotation elements. In the planetary gear set PG, the carrier C may be operated as a fixed element, the sun gear G may be connected to the input shaft IS, and the ring gear may be connected to the first motor/generator MG1 simultaneously with being operated as an output element. The sun gear S may be selectively connected to the fixed element by a brake B. The output gear OG may be connected to the first motor/generator MG1 and be engaged with the ring gear R. The output gear OG may be configured to reduce and transfer rotation power to a driven reduction gear FG of a differential DIFF through the reduction gear unit CUG. The clutch CL is the known friction member selectively connecting rotating bodies to each other.

Figure 2:
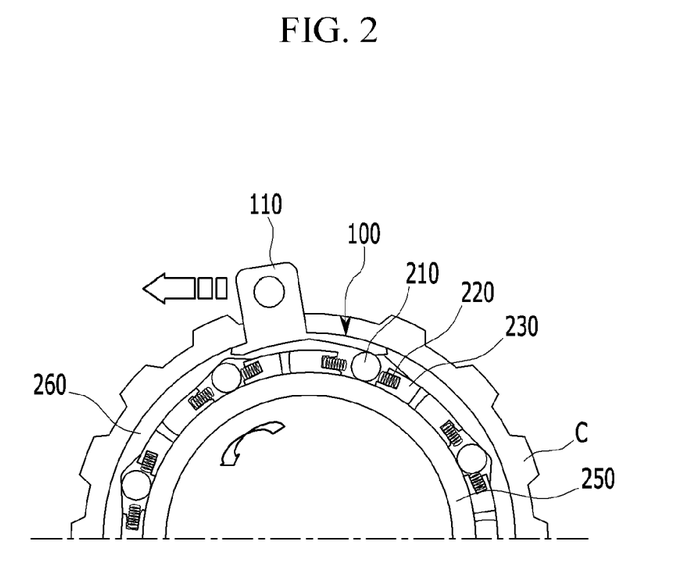
FIG. 2 is a view showing a rotation state of a carrier when a lever used in the transmission apparatus of a hybrid vehicle according to an exemplary embodiment of the present invention rotates toward a first side.
Figure 3:
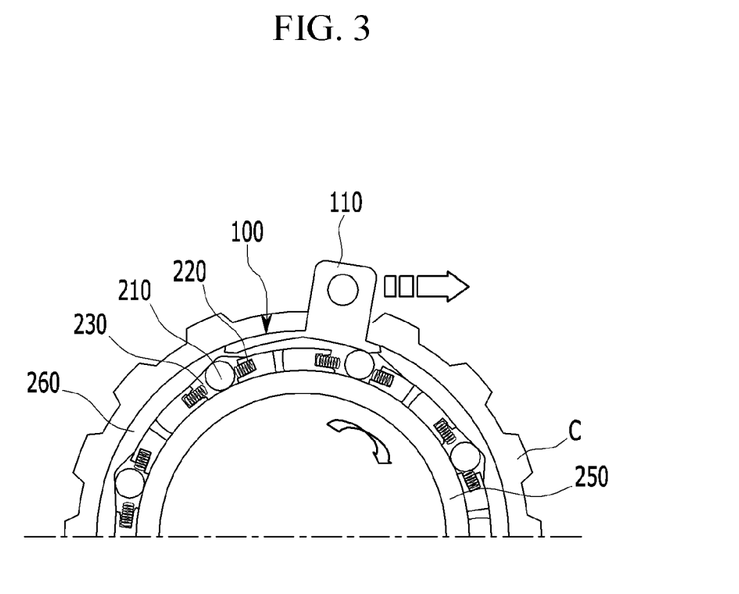
FIG. 3 is a view showing a rotation state of the carrier when the lever used in the transmission apparatus of a hybrid vehicle according to an exemplary embodiment of the present invention rotates toward a second side.
Figure 4:
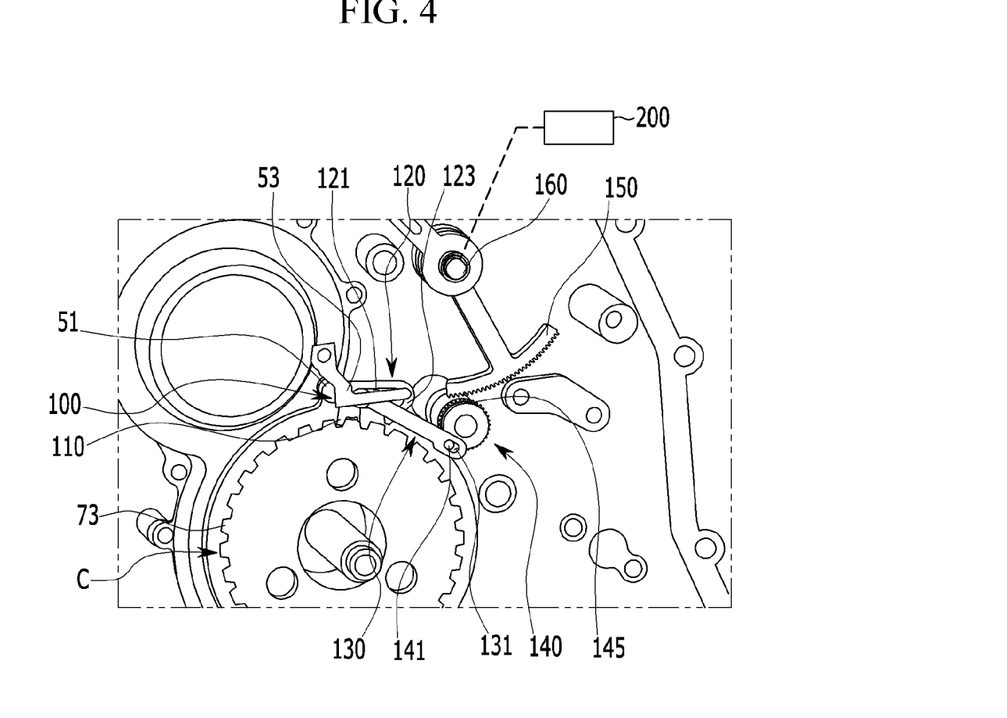
FIG. 4 is a first lateral perspective view of the two-way clutch used in the transmission apparatus of a hybrid vehicle according to an exemplary embodiment of the present invention.
Figure 5:
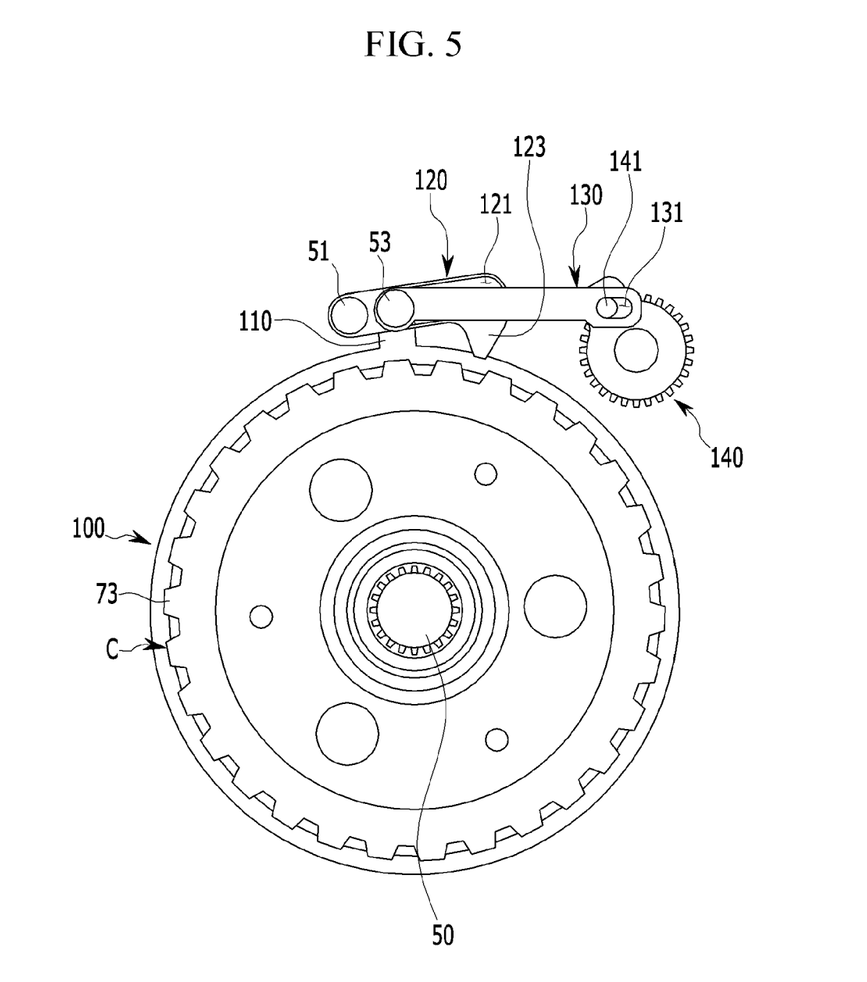
FIG. 5 is a first front perspective view of the two-way clutch used in the transmission apparatus of a hybrid vehicle according to an exemplary embodiment of the present invention.
Figure 6:
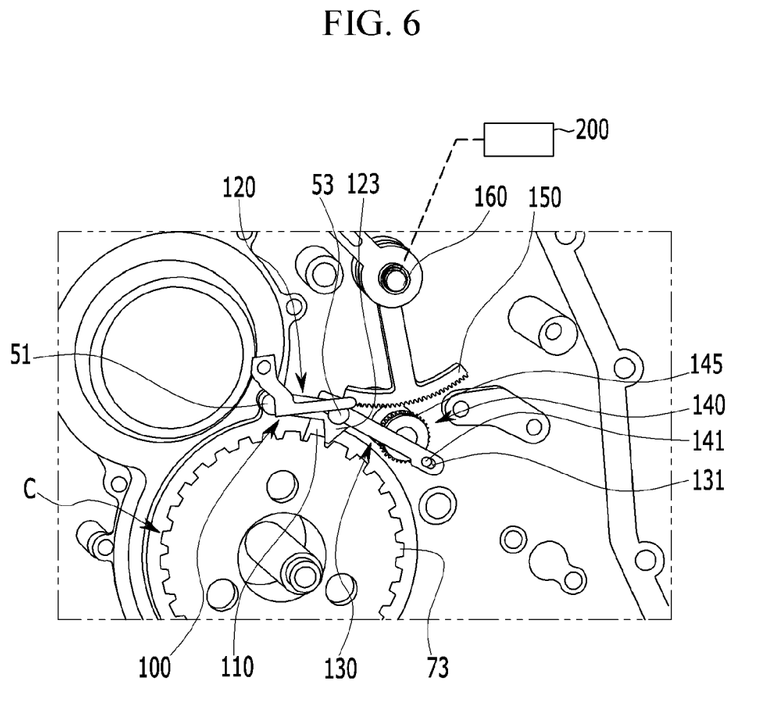
FIG. 6 is a second lateral perspective view of the two-way clutch used in the transmission apparatus of a hybrid vehicle according to an exemplary embodiment of the present invention.
Figure 7:
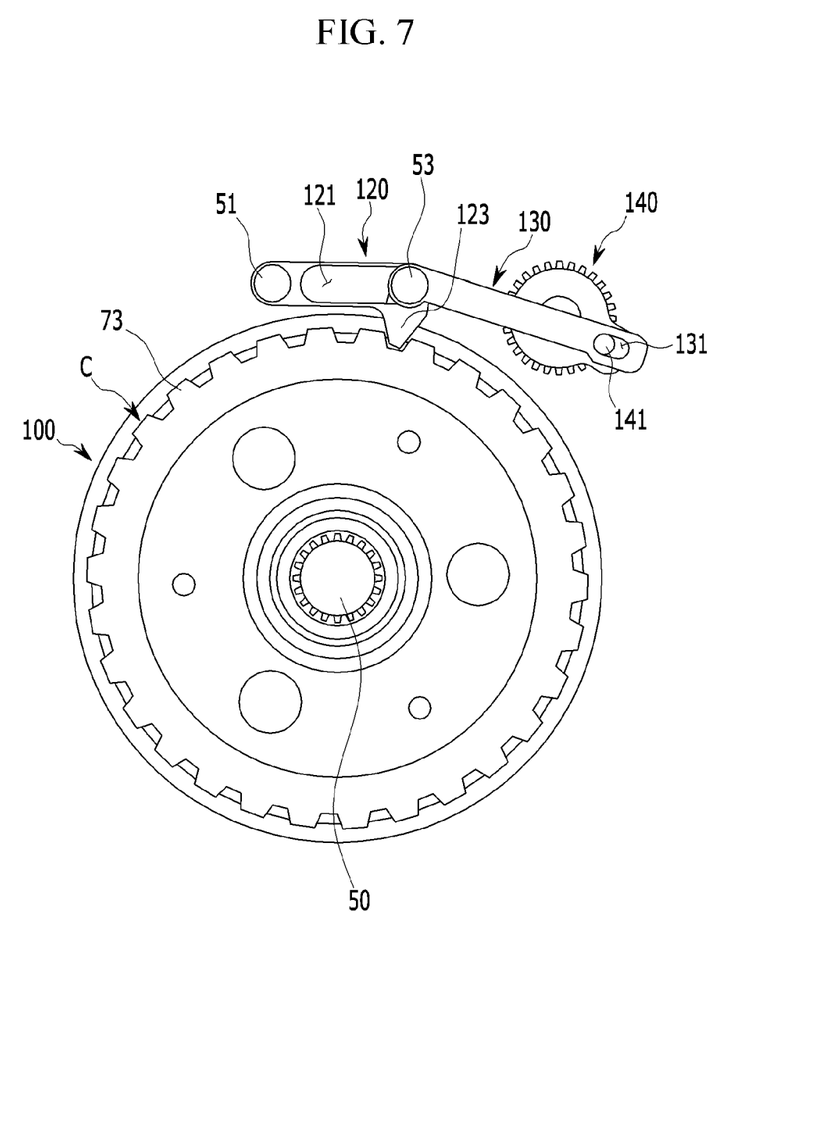
FIG. 7 is a second front perspective view of the two-way clutch used in the transmission apparatus of a hybrid vehicle according to an exemplary embodiment of the present invention.

FIG. 1 is a view of a transmission apparatus of a hybrid vehicle according to an exemplary embodiment of the present invention in which a two-way clutch is used, FIG. 2 is a view showing a rotation state of a carrier when a lever used in the transmission apparatus of a hybrid vehicle according to an exemplary embodiment of the present invention rotates toward a first side, FIG. 3 is a view showing a rotation state of the carrier when the lever used in the transmission apparatus of a hybrid vehicle according to an exemplary embodiment of the present invention rotates toward a second side, FIG. 4 is a first lateral perspective view of the two-way clutch used in the transmission apparatus of a hybrid vehicle according to an exemplary embodiment of the present invention, FIG. 5 is a first front perspective view of the two-way clutch used in the transmission apparatus of a hybrid vehicle according to an exemplary embodiment of the present invention, FIG. 6 is a second lateral perspective view of the two-way clutch used in the transmission apparatus of a hybrid vehicle according to an exemplary embodiment of the present invention, and FIG. 7 is a second front perspective view of the two-way clutch used in the transmission apparatus of a hybrid vehicle according to an exemplary embodiment of the present invention.

According to an exemplary embodiment of the present invention, the clutch CL, which may be a two-way clutch 100, may be disposed adjacent to the carrier C, and rotation in a first side direction or rotation in a second side direction may be selectively limited based on a position of an actuating lever 110. Hereinafter, the case in which the rotation of the actuating lever 110 of the two-way clutch 100 in the first side direction is called a drive (D) stage, and the case in which the rotation of the actuating lever 110 of the two-way clutch 100 in the second side direction is called a reverse (R) stage. In addition, when the actuating lever 110 is positioned at the D stage, the two-way clutch 100 is applied to the D stage, and when the actuating lever 110 is positioned at the R stage, the two-way clutch 100 is applied to the R stage.

As shown in FIGS. 1 to 7, the transmission apparatus of a hybrid vehicle according to an exemplary embodiment of the present invention may include an input shaft 50 to which power of the engine Eng is input, the carrier C, and the two-way clutch 100. The carrier C may be configured to receive the rotation power of the input shaft 50, and may be disposed concentrically with the input shaft 50. A plurality of teeth 73 may be formed on an outer peripheral surface of the carrier C. The plurality of teeth 73 may protrude radially based on the input shaft 50, and may be formed in a substantially trapezoidal saw-toothed shape. Since the plurality of teeth 73 may be formed in the trapezoidal shape wherein side surfaces thereof have inclinations, as described above, the plurality of teeth 73 may bounce a coupling 123 when they collide with the coupling 123.

Further, the two-way clutch 100 may be mounted at the carrier C, and may be applied to the D stage in which the rotation in one side (e.g., the first side) direction is limited or the R stage in which the rotation in the other side direction (e.g., the second side) is limited. The two-way clutch 100 may include the actuating lever 110, a safety unit 120, a connector 130, and a gear part 140. The actuating lever 110 allows the two-way clutch 100 to rotate in one side direction or the other side direction (e.g., in one of the direction) by a predetermined angle.

For example, when the two-way clutch 100 rotates in a clockwise direction by a predetermined angle, the two-way clutch 100 may be applied to the R stage, and when the two-way clutch 100 rotates in a counterclockwise direction by a predetermined angle, the two-clutch 100 may be applied to the D stage. In other words, when the actuating lever 110 rotates in the counterclockwise direction as shown in FIGS. 4 and 5, the two-way clutch 100 may be applied to the D stage, and when the actuating lever 110 rotates in the clockwise direction by the predetermined angle as shown in FIGS. 6 and 7, the two-way clutch 100 may be applied to the R stage.

The safety unit 120 may have one side portion (e.g., a first side portion) coupled to a fixed hinge 51, and may be configured to rotate around the fixed hinge 51. Particularly, when the actuating lever 100 rotates in the clockwise direction to be applied to the R stage, the safety unit 120 may also be configured to rotate in the clockwise direction. The coupling 123 may be formed at the other side portion (e.g., a second side portion) of the safety unit 120 to be engaged with at least some of the plurality of teeth 73. When the safety unit 120 rotates in the clockwise direction, the coupling 123 may be caught between or engaged with some of the plurality of teeth 73.

In other words, when the safety unit 120 rotates in the clockwise direction, the coupling 123 may be caught between the plurality of teeth 73 while descending simultaneously with rotating in the clockwise direction. When the carrier C is rotating due to the driving of the engine Eng, the plurality of teeth 73 may impact against the carrier C while being caught by the carrier C, and the safety unit 120 may be bounced due to generated reaction force to again rotate in the counterclockwise direction. Therefore, the safety unit 120 may prevent the two-way clutch 100 from being applied to the R stage.

Furthermore, the safety unit 120 may include a slot 121 opened in a length direction thereof. A front end of the actuating lever 110 may be coupled to a lever hinge 53 and may be disposed in the slot 121. Therefore, the actuating lever 110 coupled to the lever hinge 53 may linearly reciprocate to both sides of the safety unit 120 along the slot 121. The connector 130 may have one side coupled to the actuating lever 110 via the lever hinge 53. Therefore, the connector 130 and the actuating lever 110 may move together based on the connection there between. The gear part 140 may be connected to the connector 130, and may be operated based on an input signal of the D stage or the R stage of the two-way clutch 100. In other words, the gear part 140 may be configured to receive the input signal of the D stage or the R stage based on a state of the vehicle (e.g., a driving state of the vehicle, that is, whether the vehicle is to be driven forward or in reverse/backwards) to move the connector 130. The gear part 140 and the connector 130 may be connected by various methods.

According to an exemplary embodiment of the present invention, an insertion aperture 131 may be formed at the second side of the connector 130, and a connection protrusion 141 may be formed at the gear part 140, to connect the connection protrusion 141 to the insertion aperture 131 to be inserted into the insertion aperture 131.

Additionally, the gear part 140 may include an input gear 150 and a connection gear 145. The input gear 150 may have an arc shape, and may be configured to perform pendular movement based on a shifting input signal. The input gear 150 may include a motor 160 to rotate based on the input signal of the D stage or the R stage of the two-way clutch 100. However, the input gear 150 is not limited thereto, and may rotate by various methods (e.g., not limited to the motor control). The connection gear 145 may be engaged with the input gear 150 and may be configured to receive a torque from the input gear 150 to move the connector 130. As described above, the connection protrusion 141 may be formed at the connection gear 145 to protrude forward or rearward, and may be inserted into and connected to the insertion aperture 131 of the connector 130.

Meanwhile, according to an exemplary embodiment of the present invention, the two-way clutch 100 may further include a controller 200 configured to apply the input signal of the two-way clutch 100 based on a state of the vehicle. Next, an operation of the two-way clutch 100 will be described in more detail.

FIGS. 2, 4, and 5 show an operation of the two-way clutch 100 when the actuating lever 110 of the two-way clutch 100 is applied to the D stage. Referring to FIG. 2, rollers 210 may be interposed between an outer peripheral surface of an inner race 250 configured to receive a torque from the input shaft 50 and an inner peripheral surface of the carrier C. At least one pair of elastic members 220 may be disposed at both sides of the roller 210. Particularly, when the two-way clutch 100 is applied to the D stage, the rollers 210 may be configured to receive force applied in one side direction by the elastic members 220, and may be caught (e.g., stopped) by protruding parts 260 on the inner peripheral surface of the carrier C while rotating in the counterclockwise direction. Therefore, the carrier C may be locked in the counterclockwise direction, and freewheels in the clockwise direction, which is an opposite direction to the counterclockwise direction.

Referring to FIGS. 4 and 5, the gear part 140 may be configured to receive the input signal of the D stage from the controller 200 to move the connector 130 to one side. In addition, the actuating lever 110 connected to the connector 130 via the lever hinge 53 may also move, together with the connector 130, to one side. In particular, the front end of the actuating lever 110 may be positioned at a position higher than that of the fixed hinge 51 to which the safety unit 120 may be connected. As a result, when the actuating lever 110 moves to one side of the safety unit 120 along the slot 121 of the safety unit 120, the other side portion of the safety unit 120 may move upward while the safety unit 120 rotating in the counterclockwise direction around the fixed hinge 51.

As the other side portion of the safety unit 120 moves upward as described above, the coupling 123 formed at the other side of the safety unit 120 may also move together with the safety unit 120 upward, and may be spaced from the carrier C by a predetermined distance. Therefore, when the two-way clutch 100 is applied to the D stage, the safety unit 120 does not hinder movement of the carrier C.

FIGS. 3, 6, and 7 show an operation of the two-way clutch 100 when the two-way clutch 100 is applied to the R stage. Referring to FIG. 3, the rollers 210 may be caught (e.g., stopped or locked) by the protruding parts 260 while rotating in the clockwise direction. Therefore, the carrier C may be locked in the clockwise direction, and freewheels in the counterclockwise direction. When the two-way clutch 100 is applied to the R stage, the gear part 140 may be configured to receive the input signal from the controller 200 to move the connector 130 to the other side. In addition, the actuating lever 110 connected to the connector 130 via the lever hinge 53 may also move, together with the connector 130, to the other side.

Meanwhile, the front end of the actuating lever 110 may be positioned at a position lower than that of the fixed hinge 51 to which the safety unit 120 may be connected. As a result, when the front end of the actuating lever 110 moves to the other side of the safety unit 120 along the slot 121 of the safety unit 120, the other side portion of the safety unit 120 may move downward while the safety unit 120 rotating in the clockwise direction around the fixed hinge 51.

As the other side portion of the safety unit 120 moves downward as described above, the coupling 123 formed at the other side of the safety unit 120 may also move together with the safety unit 120 downward, and may be caught between the plurality of teeth 73 formed at the carrier C. Therefore, when the two-way clutch 100 is to be positioned at the R stage when the engine is driven, the coupling 123 caught between the plurality of teeth 73 may ascend while being bounced by impact generated when the coupling 123 is caught between the plurality of teeth 73. Therefore, the safety unit 120 may be configured to rotate again in the counterclockwise direction, preventing the two-way clutch 100 from being applied to the R stage.

When the two-way clutch 100 is positioned at the R stage while the engine Eng is driven, damage to the two-way clutch 100 may occur or the engine Eng may be stopped. However, according to an exemplary embodiment of the present invention, when the two-way clutch 100 is to be applied to the R stage while the engine Eng is driven, the two-way clutch 100 may not be applied to the R stage by the safety unit 120, thus preventing damage to the two-way clutch or preventing the engine from stopping as described above.

Meanwhile, the two-way clutch 100 may be mechanically prevented from being applied to the R stage, unlike a fluid type clutch or an electronic clutch. The fluid type clutch is operated by a torque converter control valve or a solenoid valve. However, since the fluid type clutch requires an electric oil pump to apply the two-way clutch to the D stage or the R stage, a material cost increasing significantly.

In addition, the electronic clutch controls a shifting stage by a hybrid control unit (HCU). However, in the electronic clutch a failsafe function may not be performed unlike a mechanical clutch. Therefore, a structure for preventing the two-way clutch 100 from being applied to the R stage while the engine is driven is provided in a mechanical form as in an exemplary embodiment of the present invention, such that a material cost may be decreased and a failsafe function may be performed.

Meanwhile, although an example in which components of the transmission apparatus of a hybrid vehicle are operated in the clockwise direction or the counterclockwise direction has been described hereinabove, these components may be operated in an opposite direction.

As described above, the transmission apparatus of a hybrid vehicle according to an exemplary embodiment of the present invention may perform the fail safe function by preventing the two-way clutch from being applied to the R stage during the period in which the engine is driven. Therefore, the damage to the two-way clutch may be prevented, durability of the two-way clutch may be secured, and stability of the vehicle may be improved.

In addition, the two-way clutch may be prevented from being applied to the R stage in a mechanical scheme by the safety unit, thereby making it possible to decrease a cost compared to preventing the two-way clutch from being applied to the R stage in schemes other than the mechanical scheme. Further, a layout of the two-way clutch according to the related art is utilized, thereby making it possible to minimize an additional cost.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A transmission apparatus of a vehicle, comprising:
   a planetary gear set including a first rotation element connected to an engine, a second rotation element connected to a first motor/generator, and a third rotation element connected to a second motor/generator;
   an output gear connected to any one of the second and third rotation elements;
   a two-way clutch mounted at the first rotation element and configured to limit a drive (D) stage rotation in a first side direction or limit a reverse (R) stage rotation in a second side direction selectively based on a position of a lever; and
   a safety unit configured to prevent the two-way clutch from being positioned at the R stage while the engine is driven,
   wherein the safety unit includes a coupling movable with the lever and configured to be engaged to the first rotation element when the two-way clutch is positioned at the R stage, and
   wherein the engagement of the first rotation element and the coupling is configured to be released when the engine is driven.

2. The transmission apparatus of a hybrid vehicle of claim 1, further comprising:
   a plurality of teeth that protrude radially based on an input shaft are formed at the first rotation element,
   wherein when the two-way clutch is positioned at the R stage, the coupling is caught between the plurality of teeth.

3. The transmission apparatus of a hybrid vehicle of claim 2, wherein the plurality of teeth are formed in a trapezoidal shape.

4. The transmission apparatus of a hybrid vehicle of claim 3, wherein the two-way clutch further includes:
   a controller configured to apply an input signal of the D stage or the R stage based on a state of the vehicle;
   a gear part configured to rotate based on the input signal received from the controller;
   a connector connected to the gear part and configured to move to a first side or a second side;
   an actuating lever coupled to the connector and configured to rotate in the first side direction or the second side direction to position the two-way clutch at the D stage when the connector moves to the first side and at the R stage when the connector moves to the second side; and
   a lever hinge provided to hinge-couple the connector to the actuating lever.

5. The transmission apparatus of a hybrid vehicle of claim 4, wherein the gear part includes:
   an input gear configured to perform pendular movement based on the input signal of the controller; and
   a connection gear engaged with the input gear.

6. The transmission apparatus of a hybrid vehicle of claim 5, wherein the connection gear includes a connection protrusion that protrudes forward or rearward, the connector includes an insertion aperture, and the connection protrusion is inserted into and connected to the insertion aperture.

7. The transmission apparatus of a hybrid vehicle of claim 4, wherein the safety unit has a first side coupled to a fixed hinge and has a slot formed therein and opened in a length direction thereof.

8. The transmission apparatus of a hybrid vehicle of claim 7, wherein the lever hinge linearly reciprocates to a first side or a second side within the slot.

9. The transmission apparatus of a hybrid vehicle of claim 8, wherein:
   when the two-way clutch is applied to the D stage, the lever hinge moves to the first side, to cause the safety unit to rotate in the first side direction to become distant from the first rotation element, and
   when the two-way clutch is applied to the R stage, the lever hinge moves to the second side, to cause the safety unit to rotate in the second side direction to be caught between the plurality of teeth of the first rotation element.

10. The transmission apparatus of a hybrid vehicle of claim 9, wherein the two-way clutch further includes a motor configured to receive the input signal from the controller to rotate the gear part by a predetermined angle.

11. A transmission apparatus of a hybrid vehicle using an engine and first and second motor/generators as power sources, comprising:
    a planetary gear set including a planetary carrier connected to the engine, a sun gear connected to the second motor/generator, and a ring gear operated as an output element;
    an output gear connected to the first motor/generator and engaged with the ring gear;
    a two-way clutch configured to limit a drive (D) stage rotation in a first side direction or limit a reverse (R)

stage rotation in a second side direction selectively based on a position of a lever and mounted at the planetary carrier; and a safety unit configured to prevent the two-way clutch from being positioned at the R stage while the engine is driven, wherein the safety unit includes a coupling movable with the lever and configured to be engaged to the first rotation element when the two-way clutch is portioned at the R stage, and wherein the engagement of the first rotation element and the coupling is configured to be released when the engine is driven.

12. The transmission apparatus of a hybrid vehicle of claim 11, further comprising:

a plurality of teeth that protrude radially based on an input shaft are formed at the planetary carrier, wherein when the two-way clutch is positioned at the R stage, the coupling is caught between the plurality of teeth.

13. The transmission apparatus of a hybrid vehicle of claim 12, wherein the plurality of teeth are formed in a trapezoidal shape.

14. The transmission apparatus of a hybrid vehicle of claim 13, wherein the two-way clutch further includes:

a gear part configured to rotate in the first side direction or the second side direction along the D stage or the R stage;

a connector connected to the gear part and configured to move to a first side or a second side;

an actuating lever coupled to the connector and configured to rotate in the first side direction or the second side direction to position the two-way clutch at the D stage when the connector moves to the first side and at the R stage when the connector moves to the second side; and a lever hinge provided to hinge-couple the connector to the actuating lever.

15. The transmission apparatus of a hybrid vehicle of claim 14, wherein the gear part includes a connection protrusion that protrudes forward or rearward, the connector includes an insertion aperture, and the connection protrusion is inserted into and connected to the insertion aperture.

16. The transmission apparatus of a hybrid vehicle of claim 15, wherein the safety unit has a first side coupled to a fixed hinge and has a slot formed therein and opened in a length direction thereof, and the lever hinge linearly reciprocates to a first side or a second side within the slot.

17. The transmission apparatus of a hybrid vehicle of claim 16, wherein:

when the two-way clutch is applied to the D stage, the lever hinge moves to the first side, to cause the safety unit to rotate in the first side direction to become distant from the planetary carrier, and when the two-way clutch is applied to the R stage, the lever hinge moves to the second side, to cause the safety unit to rotate in the second side direction to be caught between the plurality of teeth of the planetary carrier.

* * * * *